United States Patent [19]
Chaffin, III

[11] Patent Number: 5,565,067
[45] Date of Patent: Oct. 15, 1996

[54] EVAPORATION OF WATER USING HIGH FREQUENCY ELECTRIC FIELDS

[76] Inventor: John H. Chaffin, III, 227 Canvasback Ct., Concord, N.C. 28025

[21] Appl. No.: 513,296

[22] Filed: Aug. 9, 1995

Related U.S. Application Data

[63] Continuation of Ser. No. 221,894, Mar. 31, 1994, abandoned.

[51] Int. Cl.$^6$ .................................. B01D 3/00; C02F 1/04
[52] U.S. Cl. ..................... 203/10; 159/DIG. 26; 159/47.1; 203/100; 219/687; 219/688; 219/772
[58] Field of Search ................ 203/10, 100, 39; 392/325, 311; 159/DIG. 26, 29, 47.1; 219/687, 688, 772, 628; 202/234

[56] References Cited

U.S. PATENT DOCUMENTS

| | | | |
|---|---|---|---|
| 956,097 | 4/1910 | Hoffnagle | 159/DIG. 26 |
| 2,472,562 | 6/1949 | Bierwirth | 159/DIG. 26 |
| 2,483,623 | 10/1949 | Clayton | 159/DIG. 26 |
| 2,486,684 | 11/1949 | Schlesman et al. | 159/DIG. 26 |
| 3,681,896 | 8/1972 | Velkoff | 55/269 |
| 3,771,233 | 11/1973 | French et al. | 159/DIG. 26 |
| 3,920,945 | 11/1975 | Smith et al. | 219/688 |
| 4,165,455 | 8/1979 | Mayfield | 219/756 |
| 4,549,053 | 10/1985 | Haugh | 159/DIG. 26 |
| 4,696,718 | 9/1987 | Lasater | 202/176 |

FOREIGN PATENT DOCUMENTS

| | | | |
|---|---|---|---|
| 0932254 | 11/1947 | France | 159/DIG. 26 |
| 1063093 | 3/1989 | Japan . | |
| 6226246 | 8/1994 | Japan . | |
| 5663806 | 7/1975 | Switzerland | 159/48.1 |
| 0553019 | 5/1943 | United Kingdom | 159/DIG. 26 |
| 0582575 | 11/1946 | United Kingdom | 159/DIG. 26 |
| 00766 | 1/1992 | WIPO . | |

OTHER PUBLICATIONS

Olive "High–Frequency Electric Field Heating for Non–Metallic Materials" Chemical & Metallergical Engineering Apr. 1943 pp. 102–104.

Primary Examiner—Virginia Manoharan
Attorney, Agent, or Firm—Kinney & Lange, P.A.

[57] ABSTRACT

A method for increasing the rate of evaporation of water in a humid atmosphere by providing a high frequency electric field at the evaporating surface of the water. The method is an energy-efficient alternative to attempts to lower the humidity of the air surrounding water to be evaporated.

6 Claims, 3 Drawing Sheets

1

EVAPORATION OF WATER USING HIGH FREQUENCY ELECTRIC FIELDS

This is a continuation of application Ser. No. 08/221,894, filed Mar. 31, 1994 now abandoned.

BACKGROUND OF THE INVENTION

The following invention relates to a method and apparatus for increasing the rate of evaporation of water in a humid atmosphere through the application of a high frequency electric field.

In many parts of the world, potable water is a scarce resource. In such areas, it is not uncommon for large quantities of potable water to be supplied through the use of various thermal distillation methods. One of the most efficient currently used distilleries is the so called "flash evaporator" in which water to be evaporated is sprayed on long, hot pipes. However, even in a relatively efficient distillery, a significant problem is the slowing of the rate of evaporation caused by humid air at the evaporating surface of the water.

Even as water molecules are being evaporated, water molecules present in a humid atmosphere above the evaporant condense on the liquid water surface. The net evaporation rate of the liquid water is dependent upon the difference between these two processes. The greater the humidity of the atmosphere above the evaporant, the greater the reduction in the net evaporation rate.

One solution to this problem is to prevent the formation of a humid atmosphere at the evaporating surface of the water. This can be done in a variety of ways such as through the creation of a constant air flow at the surface of the water. However, this solution has the drawback of requiring the expenditure of large amounts of energy, thus decreasing the efficiency of the distillery.

It would therefore be desirable to have an energy-efficient method for counteracting the decrease in the rate of evaporation of water caused by a humid atmosphere at the evaporating surface of the water.

SUMMARY OF THE INVENTION

The present invention provides a method for increasing the rate of evaporation of water in a humid atmosphere, preventing the condensation of water on surfaces where it would normally be expected to form, and causing water to evaporate as pure water vapor, without the small droplets characteristic of steam. These effects are obtained through the use of a high frequency electric field.

The invention is the result of a discovery made during an investigation into the evaporation kinematics of water. During the investigation, water was allowed to evaporate under a variety of ambient conditions both with and without the application of a radio frequency (RF) electric field. It was discovered that the application of an RF electric field at the surface of the water increased the rate of evaporation of the water when the surface of the water was surrounded by a humid atmosphere. Furthermore, the water vapor from this process was free from steam droplets, and no condensation on surrounding experimental framework was observed. These effects were the result of the application of the RF electric field.

In the method of the present invention, the water to be evaporated is contained in a containment or evaporation vessel such as a boiler or a distillery and is heated to a temperature which provides the desired rate of evaporation, the energy for evaporation being delivered by electricity, combustion of fossil fuels, or other conventional means. The evaporation vessel is vented or ducted so as to make use of the evaporated water vapor.

High frequency electric fields are introduced into an evaporation chamber so as to impinge on the surface of the evaporating water, producing an acceleration in the rate of evaporation of the water, provided the atmosphere above the water is humid. The electric fields also impinge on the walls and ducts of the evaporation vessel, preventing unwanted condensation of water on these surfaces. Further, the electric fields fill the volume above the water surface, preventing the formation of water droplets. Each of these effects can be achieved simultaneously.

A high frequency electrical source is used to generate high frequency electric potentials upon an electrically conductive applicator, which is located inside the evaporation vessel above the water surface. The applicator produces electric fields in response to the electric potentials, the design of the applicator determining the distribution of the fields within the evaporation vessel. The applicator can assume a variety of configurations including wires, plates, and various antennae design.

The method of the present invention provides an effective method of accelerating the rate of evaporation of water into a humid atmosphere, preventing unwanted condensation, and preventing the formation of droplets. Compared to the large energy requirements associated with heating and evaporating the water in the evaporation vessel, the energy required to achieve these additional effects will be small.

DETAILED DESCRIPTION OF THE PREFERRED EMBODIMENTS

Figure 1:
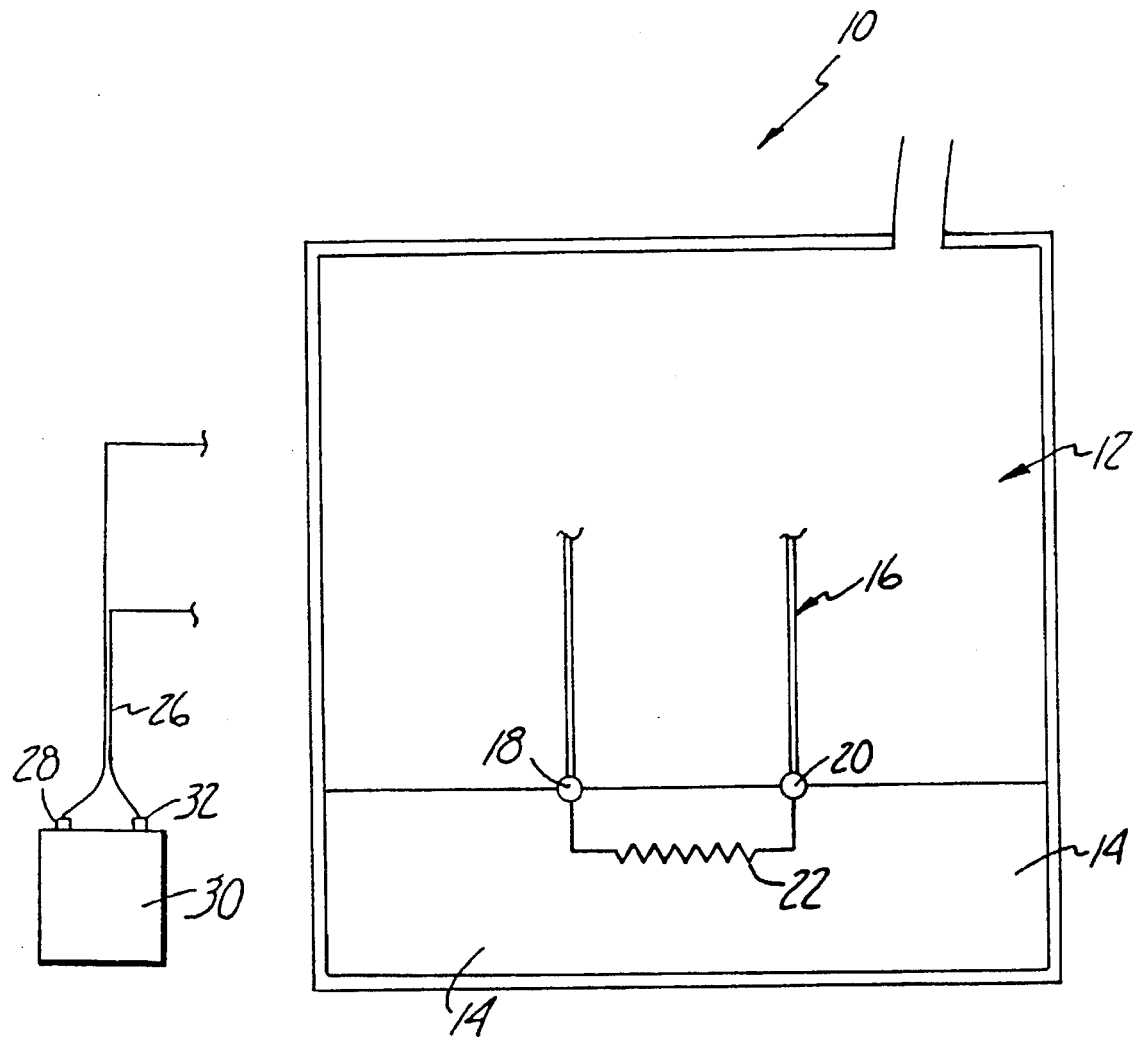
FIG. 1 is a schematic representation of a portion of an apparatus in which the method of the present invention can be practiced.

In the experiment that led to the present invention, the evaporation rate of water was determined in a variety of ambient atmospheres, both with and without the application of an RF electric field at the evaporating surface of the liquid water. It was determined that the application of an RF field at the evaporating surface of the water increases the evaporation rate when the water is surrounded by humid air. Further, condensation on nearby, cooler surfaces was eliminated, and the water vapor formed was free of water droplets.

To carry out the experiment, an RF transmitter was used which could deliver up to two kilowatts at 100 megahertz to a 50 ohm resistive load. An applicator comprising two partially immersed bare copper wires was used to introduce the RF energy to a water sample and was electrically connected to the transmitter by a coaxial cable. Two 100 ohm resistors were connected in parallel between the wires to match the impedance of the transmitter and also heated the water sample. Two power meters were connected along the coaxial transmission line to obtain input power measurements. The water sample was held in a polycarbonate container, which was substantially transparent to RF energy. An electric scale was used to measure the mass of the water sample while a thermocouple was used to measure the temperature of the sample.

Two sets of measurements were taken during the experiment for each "run" and were taken in one of the three ambient atmospheric conditions of dry flowing air, dry stagnant air and humid stagnant air at the evaporating surface of the water sample. In the first set of measurements, the water sample was heated by exposing the sample to RF power for an extended period of time. The RF power was then reduced to zero and both mass and temperature readings were periodically taken. In the second set of measurements, which were taken immediately after the first set, the water sample was first heated for an extended period of time through exposure to RF power. While continuing to be apply the RF power, mass and temperature readings were periodically taken. The evaporation rate of the water sample was then calculated from each set of recorded measurements.

The atmospheric condition of dry flowing air was created through the use of a stream of compressed air which was gently blown over the evaporating surface of the water sample. The atmospheric condition of humid stagnant air was created by allowing the humid laboratory conditions to exist over the evaporating surface of the water sample. However, the exact humidity at the surface of the water sample was not determined. Further variations in the experiment consisted of taking the above-described measurements for samples of tap water, distilled water and salt water. The results from various "runs" made during the experiment are shown in the following table:

| Ambient Conditions | Run # | Nom Evap Rate (g/s) | RF Evap Rate (g/s) | RF/ Nom | Water Type | Run Temp (C) |
|---|---|---|---|---|---|---|
| Dry | DF1 | 4.50 | 4.55 | 1.01 | dist. | 67 |
| flowing | DF2 | 4.50 | 4.58 | 1.02 | salt | 70 |
| air | DF3 | 3.98 | 4.03 | 1.01 | salt | 66 |
| Dry | DS1 | 4.68 | 4.82 | 1.03 | dist. | 80 |
| stagnant | DS2 | 4.25 | 4.20 | 0.99 | dist. | 76 |
| air | DS3 | 3.62 | 3.68 | 1.02 | dist. | 73 |
| Humid | H1 | 5.04 | 5.90 | 1.17 | salt | 83 |
| stagnant | H2 | 4.43 | 5.07 | 1.14 | salt | 81 |
| air | H3 | 4.32 | 5.47 | 1.26 | dist. | 78 |
| | H4 | 3.47 | 4.15 | 1.20 | dist. | 70 |
| | H5 | 1.91 | 2.22 | 1.16 | salt | 66 |
| | H6 | 1.62 | 1.74 | 1.07 | salt | 61 |
| | H7 | 3.96 | 4.77 | 1.20 | dist. | 74 |
| | H8 | 4.42 | 5.86 | 1.32 | tap | 79 |

The "Nom Evap Rate" is the evaporation rate of the water sample without the continued application of an RF field. The "RF Evap Rate" is the evaporation rate of the water sample with the continued application of an RF field. "RF/Nom" is the ratio of the RF Evap Rate to the Nom Evap Rate. The "Run Temp" is the temperature of the water sample during the period of time when the second set of measurements were taken. From this data, it can be seen that the application of the RF electric field had the greatest effect when the ambient atmospheric condition was humid stagnant air.

A schematic representation of a portion of an apparatus 10 in which the method of the present invention can be utilized is shown in FIG. 1. The apparatus 10 includes an evaporation chamber 12 containing a quantity of water 14 to be evaporated and an applicator 16 for introducing radio frequency energy into the evaporation chamber 12. The evaporation chamber 12 is vented so as to make use of the evaporated water vapor.

The applicator 16 comprises a first copper wire 18 and a second copper wire 20 which extend generally parallel to each other and parallel to the surface of the water 14. Both the first wire 18 and the second wire 20 are partially submerged in the water 14. A pair of resistors 22 extend between and are electrically connected to the first and second wires 18 and 20 to provide a resistive load. A transmission line 26 electrically connects both the first wire 18 to a first terminal 28 of an RF signal generator 30 and the second wire 20 to a second terminal 32 of the RF signal generator 30.

In the method of the present invention, the water 14 in the evaporation chamber 12 is heated by the action of RF electric fields and by the heat generated in the resistors 22. Heating the water 14 raises the vapor pressure of the water 14 and promotes evaporation. The signal generated by the RF signal generator 30 is transmitted to the applicator 16 via the transmission line 26 and creates a potential difference between the first wire 18 and the second wire 20. A radio frequency electric field is thus provided at the surface of the water 14 by the first and second wires 18 and 20. The RF electric field exists between the wires 18 and 20, and also extends above the water. It is thus able to accelerate the evaporation of the water 14 if the ambient atmosphere is humid, prevent the condensation of water on nearby surfaces, and prevent the formation of water droplets.

The RF signal generator 30 can be replaced by a signal generator that produces high frequency (HF) electrical signals at any of a wide range of desired frequencies. While a signal having a frequency of 100 megahertz has been proven effective in the method of the present invention, it is anticipated that frequencies at least as low as 10 kilohertz and at least as high as 300 gigahertz can be used. It would be desirable to implement the present method using an electric field having a frequency of 13.56 megahertz, as that frequency has been set aside by the FCC for hospital and industrial uses. It would also be desirable to implement the present method at the commercial microwave frequency of 2.45 gigahertz, because of the easy availability of devices for producing an HF electric field at this frequency.

The primary effect of a high frequency electric field, when applied to water, is to cause the water molecules to rotate. This is due to the dipolar nature of water. This rotation interferes with the ability of the water molecules to condense, which was shown in this invention in both the lack of condensation onto cooler surfaces and the lack of condensation onto microparticles in the air, which would have led to steam droplets if no HF electric field were present. The HF electric field reduces the ability of water molecules in a humid atmosphere to condense onto the evaporating water surface in a similar manner which, in turn, raises the net evaporation rate. Thus, decreased condensation of water under the influence of HF electric fields can account for all of the observables of this invention.

The HF electric field must be applied at the evaporating surface of the water 14 to prevent the formation of water droplets as the water 14 evaporates. Once water droplets form, the HF electric field will not be able to break them apart. In addition, without the continued application of the HF electric field, the rotation of the water vapor molecules will cease, resulting in the formation of water droplets in the water vapor. Therefore, to prevent condensation of the water vapor, it is necessary to maintain the HF electric field throughout the entire evaporation chamber 12 as well as in any other area in which it is desired to maintain a clear vapor.

Similarly, if it is desired to prevent the condensation of water vapor onto a surface through the use of a HF electric field, the field must be present from the first moment condensation is sought to be prevented. This is because while the HF electric field will prevent the condensation from forming, it will not remove water condensation from a surface once it has formed.

The frequencies at which an HF electric field will be effective are limited by both physical and practical considerations. At higher frequencies, the increased speed with which the HF electric field reverses polarity causes the inertial forces associated with the rotation of the water vapor molecules to have a greater effect in countering the rotation of the molecules. At sufficiently high frequencies, the inertial forces of the water vapor molecules will be large enough to prevent the electric field from rotating the molecules. Also, the cost of the equipment necessary to create a HF electric field at frequencies above 10 gigahertz will be very high.

At lower frequencies, the HF electric field reverses polarity more slowly, resulting in a slower rotation of the water vapor molecules. At sufficiently low frequencies, the rotation of the water vapor molecules is slow enough so that the HF electric field does not have the desired effects. In addition, at lower frequencies the increased wavelength of the HF electric field makes it more difficult to provide the field in the evaporation chamber 12. This is because the dimensions of the evaporation chamber 12 must be large enough relative to the wavelength to allow the load of the chamber and its contents to match the output impedance of the signal generator 30. At sufficiently low frequencies, the construction of an evaporation chamber 12 large enough to match the output impedance of the signal generator 30 becomes prohibitively difficult.

Figure 2:
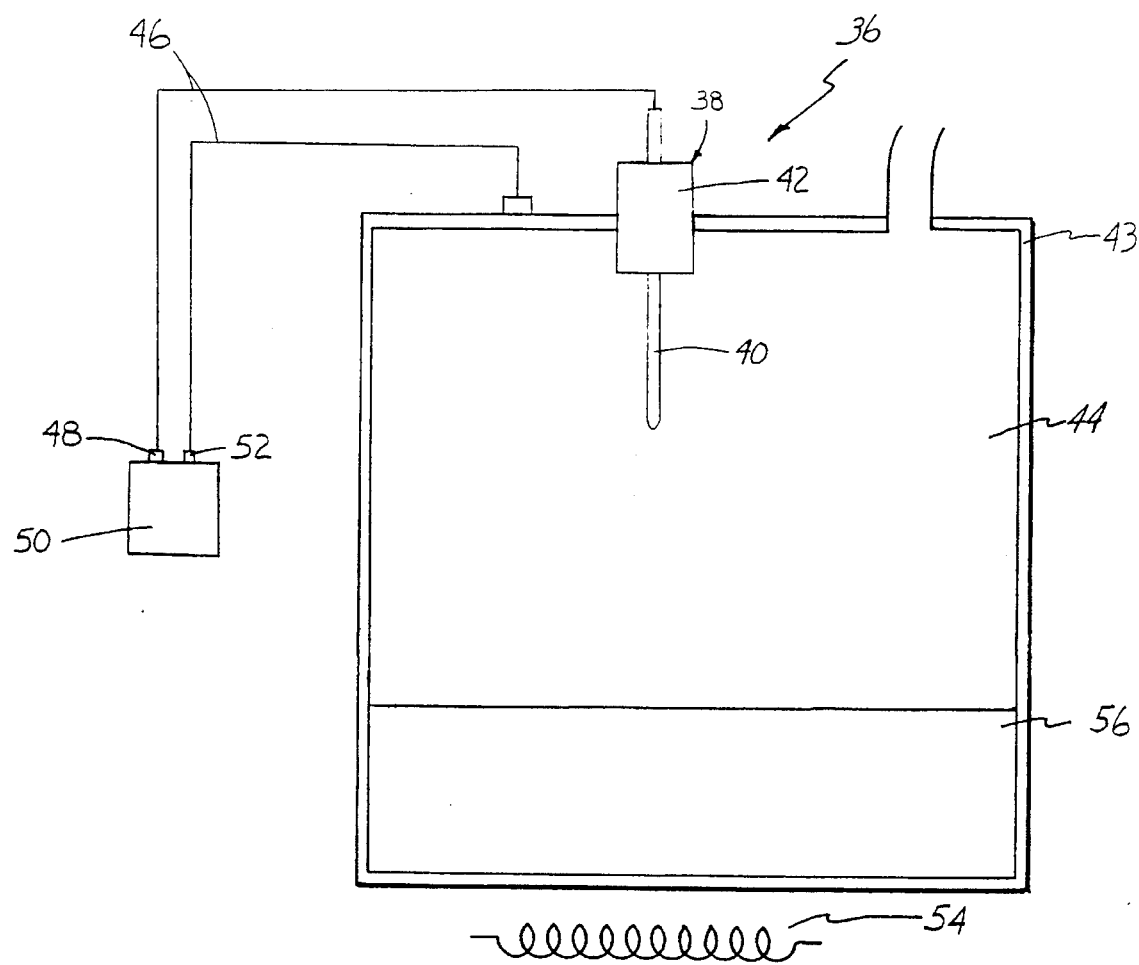
FIG. 2 is a schematic representation of a portion of an apparatus, utilizing an alternative applicator, in which the method of the present invention can be practiced.

A first alternative apparatus 36 of the present invention is shown in FIG. 2 and includes an applicator 38 comprising a metal red 40 and an electrically insulating feed-through 42, which allows the metal rod 40 to pass through the top of a metal frame 43 defining an evaporation chamber 44 without making electrical contact with the frame 43. A transmission line 46 having two conductors electrically connects the metal rod 40 to a first terminal 48 of a high frequency transmitter 50 and the frame 43 to a second terminal 52 of the HF transmitter 50. The length of the metal rod 40 is chosen so as to be advantageous as an antenna at the frequency of the HF transmitter 50. A heating method 54, such as a heating element, is positioned to heat a quantity of water 56 in the evaporation chamber 44.

Figure 3:
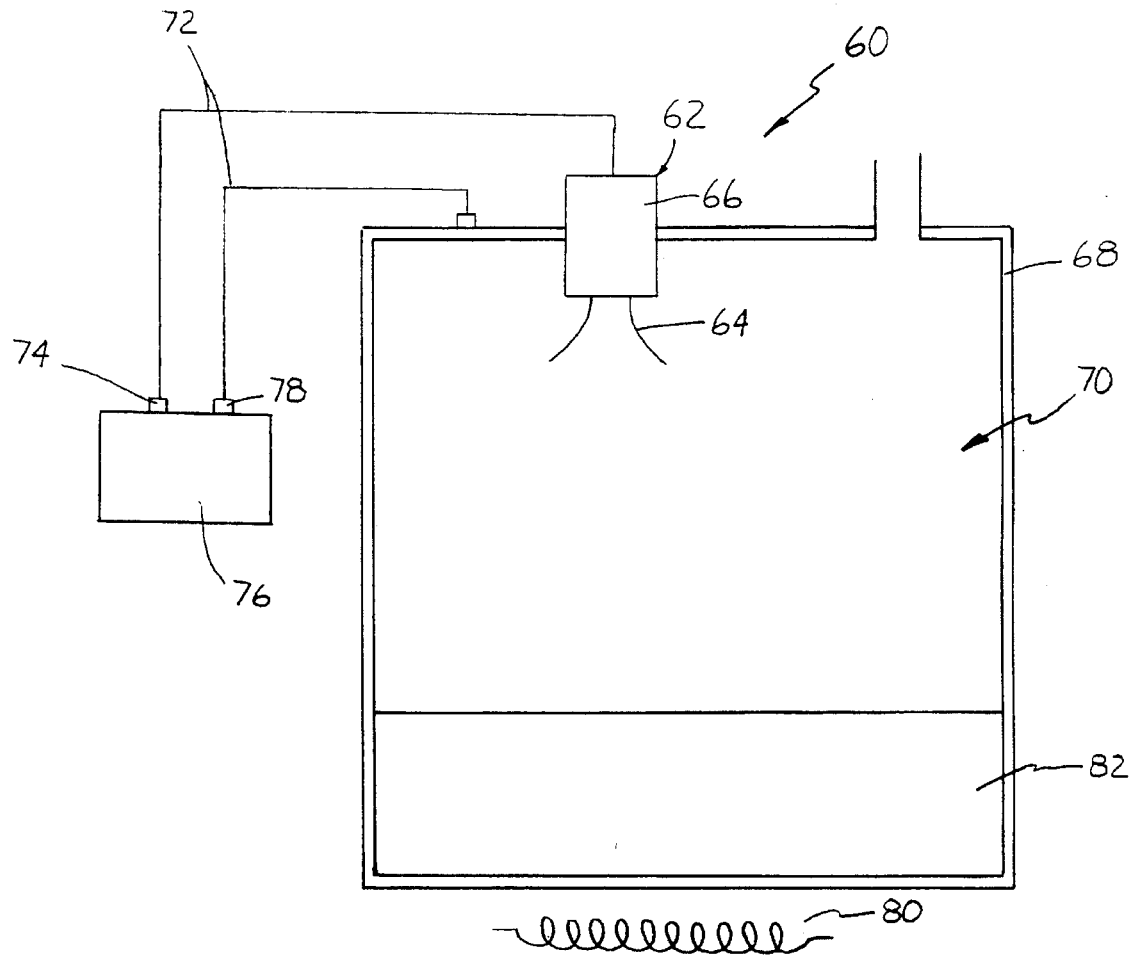
FIG. 3 is a schematic representation of a portion of an apparatus, utilizing an alternative applicator, in which the method of the present invention can be practiced.

A second alternative apparatus 60 of the present invention is shown in FIG. 3 and includes an applicator 62 comprising a microwave horn antenna 64 and an electrically insulating feed-through 66, which allows the microwave antenna 64 to pass through the top of a metal frame 68 defining an evaporation chamber 70 without making electrical contact with the frame 68. A transmission line 72 having two conductors electrically connects the microwave antenna 64 to a first terminal 74 of a microwave generator 76 and the frame 68 to a second terminal 78 of the microwave generator 76. A heating method 80, such as a heating element, is positioned to heat a quantity of water 82 in the evaporation chamber 70.

Although described as being a horn antenna, the shape of the microwave antenna 64 can be any shape and is chosen so as to be advantageous as an antenna at the frequency of the microwave generator 76. The conductors of the transmission line 72 can be wires, microwave waveguides or coaxial cables.

In addition to the configurations described above, the applicator for delivering the HF electric field can have a variety of shapes and can be fabricated from a variety of materials. The orientation of the HF electric field will not affect its effectiveness in achieving the effects of preventing the condensation of water vapor on surfaces, preventing the formation of water droplets in the water vapor and increasing the rate of evaporation of water.

While the power necessary to carry out the method of the present invention will vary depending on the application, it is unlikely to exceed 5 milliwatts per square centimeter, and may require as little as 5 microwatts per square centimeter. Therefore, the method of the present invention provides an energy-efficient method of increasing the rate of evaporation of water, preventing condensation, and eliminating water droplets. The overall efficiency of a distillery or other evaporation application can therefore be significantly increased.

The method of the present invention substantially increases the rate of evaporation of water only when the atmosphere surrounding the evaporating surface of water contains a quantity of water vapor. Where the atmosphere surrounding the evaporating surface of water is not humid, the presence of a HF electric field does not have as great an effect on the rate of evaporation. In most practical evaporation applications, because there is usually a substantial amount of water vapor in the atmosphere surrounding the water to be evaporated, the present invention is an effective way to increase the rate of evaporation.

While the present invention has been described with reference to increasing the rate of evaporation of water, the method can be used to increase the rate of evaporation of other polar molecular liquids as well. In addition, the method of the present invention will be effective even if the water being evaporated is heated to its boiling point.

By increasing the rate of evaporation of water, the application of a HF electric field will also cause an increase in the number of water molecules in the vapor phase in the evaporation chamber 12. This increase will result in an increase in the pressure of the water vapor in the evaporation chamber 12. Thus, the HF electric field can be used to create an increase in the pressure in a closed vessel.

Although the present invention has been described with reference to preferred embodiments, workers skilled in the art will recognize that changes may be made in form and detail without departing from the spirit and scope of the invention.

What is claimed is:

1. A method for evaporating liquid from a liquid surface into a surrounding atmosphere containing a vapor of the liquid, the method consisting essentially of:

heating the liquid to cause evaporation at the liquid surface at a first evaporation rate; and applying a high frequency electric field at the liquid surface to cause evaporation at a second evaporation rate, which is greater than the first evaporation rate, wherein the high frequency electric field has a frequency between 10 kilohertz and 300 gigahertz.

2. The method of claim 1 wherein the liquid is water.

3. A method for increasing the rate of evaporation of a liquid having a surrounding atmosphere containing a vapor of the liquid, the method consisting essentially of the steps of:

heating the liquid to cause evaporation at a surface of the liquid exposed to the surrounding atmosphere, such that evaporation occurs at a first net rate; and applying a high frequency electric field at the surface of the liquid, wherein the application of the high frequency electric field substantially prevents the vapor from condensing at the surface of the liquid and thereby causes an increase in the rate of evaporation from the first net rate to a second net rate that is higher than the first net rate, wherein the high frequency electric field has a frequency between 10 kilohertz and 300 gigahertz.

4. The method of claim 3 wherein the liquid is water.

5. A method for preventing the formation of water droplets in a water vapor, the method consisting essentially of the steps of:

heating the water to produce water vapor; and applying a high frequency electric field to the water vapor to prevent water droplets from forming in the water vapor, wherein the high frequency electric field has a frequency between 10 kilohertz and 300 gigahertz.

6. A method for preventing undesired condensation of water on an internal surface of a water evaporation system, consisting essentially of the steps of:

heating water to produce water vapor within the water evaporation system; and applying a high frequency electric field at the internal surface of the water evaporation system to prevent condensation of water on the surface, wherein the electric field has a frequency between 10 kilohertz and 300 gigahertz.

* * * * *